Figure 4:
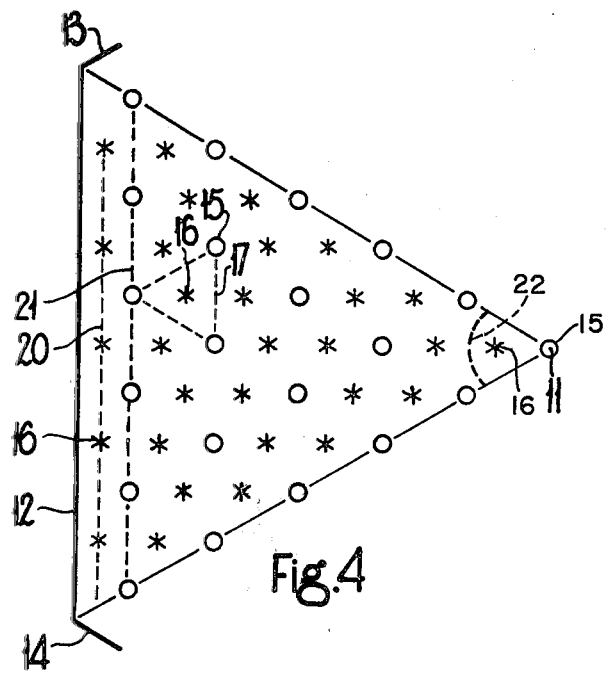

United States Patent
Cunningham et al.

[11] 3,888,735
[45] June 10, 1975

[54] INTEGRAL-FUEL BLOCKS

[75] Inventors: Christopher Cunningham, Leicester; Sidney David Simpkin, Enderby, both of England

[73] Assignee: British Nuclear Design of Construction Ltd., Leicestershire, England

[22] Filed: June 25, 1973

[21] Appl. No.: 373,032

[30] Foreign Application Priority Data
June 30, 1972 United Kingdom............... 30781/72

[52] U.S. Cl. .................................................. 176/84
[51] Int. Cl. ............................................... G21c 5/02
[58] Field of Search................................. 176/84, 43

[56] References Cited
UNITED STATES PATENTS
2,852,457  9/1958  Long et al............................. 176/84
3,081,247  3/1963  Balent..................................... 176/84
3,413,196  11/1968  Fortescue et al. ................. 176/84

Primary Examiner—Samuel Feinberg
Assistant Examiner—C. T. Jordan
Attorney, Agent, or Firm—Kirschstein, Kirschstein, Ottinger & Frank

[57] ABSTRACT

A prismatic moderator block having fuel-containing channels and coolant channels disposed parallel to each other and to edge faces of the block, with the coolant channels arranged in rows on an equilateral triangular lattice pattern and the fuel-containing channels disposed in a regular lattice pattern with one fuel-containing channel between and equidistant from each of the coolant channels in each group of three mutually adjacent coolant channels. The edge faces of the block are parallel to the rows of coolant channels and the channels nearest to each edge face are disposed in two rows parallel thereto, with one of the rows containing only coolant channels and the other row containing only fuel-containing channels.

7 Claims, 4 Drawing Figures

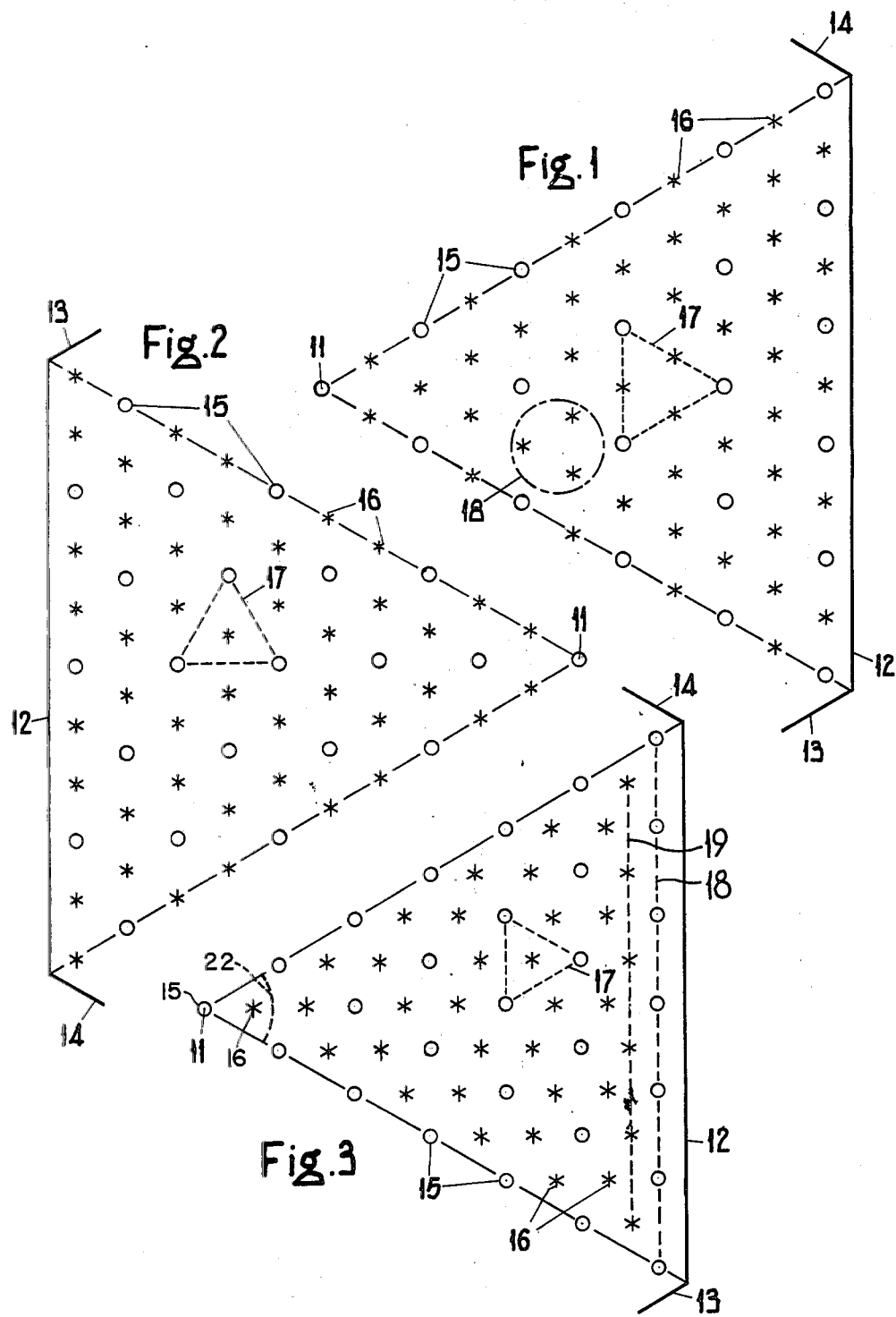

INTEGRAL-FUEL BLOCKS

This invention relates to nuclear reactors, and more particularly to fuel-containing moderator blocks for a High Temperature Reactor (H.T.R.).

In a H.T.R., in which the higher temperature at which the fuel can operate, as compared with earlier reactor designs such as the advanced gas cooled reactor (A.G.R.), permitting more efficient operation of the reactor, the core components must be capable of withstanding the high temperatures encountered and are of ceramic material, e.g. graphite for the moderator and fuel canning material and uranium dioxide as the fuel. In the "integral block design" in which graphite blocks which are stacked to form the moderator core of the reactor serve also as containers for the fuel so that no separate cladding for the fuel is required, the fuel contained in each such block is distributed in a first set of parallel channels extending through the block and closed at their ends and the block is also formed with a second set of channels, parallel with those of the first set and extending completely through the block from end to end thereof, through which is passed coolant which removes heat generated by the fuel. The channels of the second set (i.e. the coolant channels) are distributed among those of the first set (i.e. the fuel-containing channels) so as to provide efficient removal of the heat generated. Fuel-containing moderator blocks of this kind are described in, for example, United Kingdom Patent Specification No. 1,101,600 filed on Aug. 24, 1966.

In the design of such fuel-containing moderator blocks it is important to ensure not only that efficient removal of the generated heat will be achieved but also that the stresses and strains arising within the block due to differential thermal and radiation-induced effects should not exceed the limits of integrity of the material of the block, even at the high temperatures involved. For the achievement of this latter objective it is desirable to minimise temperature differentials throughout the block both at and remote from its edges and any handling or control-rod hole or holes with which it may be formed. Within the body of the block, any of several regular, uniform distributions of coolant channels and fuel-containing channels can provide a suitably uniform temperature distribution; but not all these distributions provide a desirable degree of temperature uniformity at the edges of the block and near the control rod or handling channels.

An object of the present invention is to provide a fuel-containing moderator block having fuel-containing channels and coolant channels distributed in a pattern which provides good temperature uniformity of the block both at the edges of the block and remote therefrom.

According to the present invention there is provided a prismatic fuel-containing moderator block having two kinds of channels, namely fuel-containing channels and coolant channels, disposed parallel to each other and to edge faces of the block, with the coolant channels arranged in rows on an equilateral triangular lattice pattern and the fuel-containing channels disposed in a regular lattice pattern with one fuel-containing channel between and equidistant from each of the coolant channels in each group of three mutually-adjacent coolant channels, wherein the edge faces of the block are parallel to the rows of coolant channels and the channels nearest to each edge face are disposed in two rows parallel thereto, with one of the two rows containing only coolant channels and the other of the two rows containing only fuel-containing channels.

Preferably, the block is a regular hexagonal prism and the respective rows of channels nearest to each edge face all contain only channels of one kind.

The invention will now be described, by way of example, with reference to the accompanying drawings in which:

FIG. 1 is a representation of the arrangement or distribution of fuel-containing channels and coolant channels in a first known fuel-containing moderator block, FIG. 2 is a similar representation referring to a second known fuel-containing moderator block, and FIGS. 3 and 4 are similar representations of the arrangement or distribution of fuel-containing channels and coolant channels in fuel-containing moderator blocks according to the invention.

FIG. 1 relates to a regular hexagonal prismatic fuel-containing moderator block of known kind, as disclosed in the above-mentioned United Kingdom Patent Specification No. 1,101,600, filed on Aug. 24, 1966 and shows the arrangement of fuel-containing channels and coolant channels of one-sixth of the block (between the block centre 11 and one edge face 12 thereof). Parts of the adjacent edge faces 13 and 14 are shown and the channel arrangement in each of the other five-sixths (not shown) of the block is the same as that in the illustrated sixth. That is, coolant channels 15 (of which the positions are indicated in the drawing by small circles) are arranged in rows on an equilateral triangular lattice pattern, and each of a plurality of fuel-containing channels 16 (of which the positions are indicated in the drawing by stars) is disposed directly between two mutually adjacent ones of the coolant channels 15 and equidistant therefrom. Expressed in another way, each group of three mutually adjacent coolant channels 15 defines an equilateral triangle (one such triangle 17 being shown in broken lines), and three fuel-containing channels 16 are positioned at the midpoints of the respective sides of this triangle. The edge faces of the block are each, like the edge face 12, parallel to a plane containing one of the rows of coolant channels 15 or, in other words, to one of the sides of the triangle 17.

The known arrangement shown in FIG. 1 is not very satisfactory from the point of view of temperature uniformity in use, firstly because it results, both near and remote from the edge faces of the block, in clusters of three fuel-containing channels 16 (such as the cluster 18 enclosed in chain line) with no coolant channel between them, and secondly because, adjacent each edge face of the block, it produces a row consisting of coolant channels 15 and fuel-containing channels 16 arranged alternately.

Another known arrangement is shown in FIG. 2 which, like FIG. 1, represents the arrangement of coolant channels 15 (circles) and fuel-containing channels 16 (stars) in one-sixth of a regular hexagonal prismatic moderator block of which the centre 11 and at least parts of three of the edge faces 12, 13 and 14 are shown. In this arrangement also, the coolant channels 15 are arranged in rows on an equilateral triangular lattice pattern so that three mutually adjacent coolant channels 15 define an equilateral triangle 17. In this case, however, the fuel-containing channels are disposed not on the sides but at the centres of the triangles 17, and as a result the first-mentioned disadvantage of the arrangement shown in FIG. 1 is avoided, inasmuch as the arrangement shown in FIG. 2 has no clusters of three fuel-containing channels like the clusters 18 of FIG. 1. However, from the point of view of temperature uniformity at the edge faces of the block, the known arrangement shown in FIG. 2 is, if anything, worse than that shown in FIG. 1, because, in the arrangement shown in FIG. 2, rows of channels parallel to and immediately adjacent to the edge faces consist of pairs of fuel-containing channels 16, rather than single fuel-containing channels, alternating with coolant channels 15. It will be observed that in FIG. 2 the edge faces 12, etc., of the block are not parallel to the sides of the triangle 17.

In the embodiment of the present invention represented in FIG. 3, use is made of the same pattern of coolant and fuel-containing channels (so far as their relationships with one another are concerned) as in FIG. 2, but with a different orientation of the pattern relative to the edge faces of the block. Thus FIG. 3 represents the pattern and distribution of coolant channels 15 and fuel-containing channels 16 in one-sixth of a regular hexagonal prismatic moderator block according to the invention, the block having a centre 11 and edge faces of which three are shown referenced 12, 13 and 14. As in FIG. 2, the coolant channels 15 are arranged in rows on an equilateral triangular lattice pattern so that any three mutually adjacent coolant channels define an equilateral triangle 17, and the fuel-containing channels 16 are disposed each at the centre of such a triangle and thus equidistant from three of the coolant channels 15. Im the embodiment of the invention shown in FIG. 3, however, each of the edge faces 12, etc., of the block is parallel to one of the sides of such triangles 17 and thus to a plane containing one of the said rows of coolant channels 15. As in FIG. 2, there are no clusters of three fuel-containing channels 16 without any coolant channel between them; but, differing from both FIGS. 1 and 2, in FIG. 3 the channels nearest to each edge face such as 12 are disposed in two rows parallel thereto, one row 18 immediately adjacent the edge face 12 containing only coolant channels 15, and the other row 19 containing only fuel-containing channels 16, so that temperature uniformity at the edge faces of the block is correspondingly improved.

The embodiment of the invention represented in FIG. 3 may be provided with channels 22 for the reception of control rods for block handling, preferably arranged symmetrically relative to the lattice pattern and in such manner that all the immediately adjacent channels are coolant channels 15 rather than fuel channels 16. Thus as shown, a channel 22 for the reception of a control rod or for block handling, may be provided in place of one coolant chamber 15 and the surrounding six fuel-containing channels 16.

The embodiment of the invention shown in FIG. 4 is similar to that shown in FIG. 3 except that the row 18 of coolant channels adjacent the edge face 12 and the adjacent row 19 of fuel-containing channels are omitted as also are the corresponding rows of coolant channels and fuel-containing channels adjacent the other edge faces such as 13 and 14. Each edge face such as 12, 13, and 14 is nearer to the block centre 11 than in FIG. 3. Therefore, throughout the main part of the block, away from the edge faces, there are no clusters of three fuel-containing channels without any coolant channel between them since each fuel-containing channel 16 is disposed at the centre of an equilateral triangle 17 of coolant channels 15. Also, the channels nearest to each edge face such as 12 are disposed in two rows parallel thereto, one row 20 immediately adjacent the edge face 12 containing only fuel-containing channels 16, and the other row 21 containing only coolant channels 15, so that temperature uniformity at the edge faces of the block is obtained.

We claim:

1. A prismatic fuel-containing moderator block having two kinds of channels, namely fuel-containing channels and coolant channels, disposed parallel to each other and to edge faces of the block, with the coolant channels arranged in rows on an equilateral triangular lattice pattern and the fuel-containing channels disposed in a regular lattice pattern with one fuel-containing channel between and equidistant from each of the coolant channels in each group of three mutually-adjacent coolant channels, wherein the edge faces of the block are parallel to the rows of coolant channels and the channels nearest to each edge face are disposed in two rows parallel thereto, with one of the two rows containing only coolant channels and the other of the two rows containing only fuel-containing channels.

2. A moderator block as claimed in claim 1, wherein that one of the said two rows which is nearer to the said edge face contains only coolant channels.

3. A moderator block as claimed in claim 1, wherein that one of the said two rows which is nearer to the said edge face contains only fuel-containing channels.

4. A moderator block as claimed in claim 1, wherein the block is a regular hexagonal prism and the respective rows of channels nearest to each edge face all contain only channels of one kind.

5. A moderator block as claimed in claim 1, including further channels, for the reception of control rods and for block handling, arranged symmetrically relative to the lattice pattern.

6. A moderator block as claimed in claim 5, wherein the channels immediately adjacent a control rod channel are coolant channels.

7. A moderator block as claimed in claim 5, wherein the channels immediately adjacent a block handling channel are coolant channels.

* * * * *